(12) United States Patent
Pan

(10) Patent No.: US 9,560,811 B2
(45) Date of Patent: Feb. 7, 2017

(54) POWER DRIVEN HEDGE TRIMMER WITH MOVABLE FRONT HANDLE

(71) Applicant: JENN FENG NEW ENERGY CO., LTD., Ping Chang, Taoyuan County (TW)

(72) Inventor: Chih-Ling Pan, Ping Chang (TW)

(73) Assignee: JENN FENG NEW ENERGY CO., LTD., Ping Chang (TW)

( * ) Notice: Subject to any disclaimer, the term of this patent is extended or adjusted under 35 U.S.C. 154(b) by 30 days.

(21) Appl. No.: 14/617,371

(22) Filed: Feb. 9, 2015

(65) Prior Publication Data
US 2016/0227711 A1    Aug. 11, 2016

(51) Int. Cl.
*A01G 3/053*    (2006.01)
*B25F 5/02*    (2006.01)

(52) U.S. Cl.
CPC .............. *A01G 3/053* (2013.01); *B25F 5/026* (2013.01)

(58) Field of Classification Search
CPC .... A01G 3/053; A01G 3/0535; A01G 3/0475; B25F 5/02; B25F 5/026; B27B 17/0008
USPC .................................................... 30/210, 216
See application file for complete search history.

(56) References Cited

U.S. PATENT DOCUMENTS

| | | | | |
|---|---|---|---|---|
| 2,573,573 A | * | 10/1951 | Jenkins ............... | B23D 51/02 123/195 R |
| 3,143,798 A | * | 8/1964 | Lundquist .......... | A01G 3/053 30/131 |
| 3,217,408 A | * | 11/1965 | Jepson ................ | A01G 3/053 30/144 |
| D237,352 S | * | 10/1975 | Shymkus ............. | D8/65 |
| 3,932,015 A | * | 1/1976 | Ware ................... | A01G 3/053 30/216 |
| 4,280,276 A | * | 7/1981 | Comer ................ | A01G 3/053 30/144 |
| D325,859 S | * | 5/1992 | Yokota ................ | D8/65 |
| 5,172,522 A | * | 12/1992 | Jares .................. | B24B 23/005 16/426 |
| 5,426,856 A | * | 6/1995 | Aiyama .............. | A01G 3/053 30/208 |
| 5,581,891 A | * | 12/1996 | Wheeler ............. | A01G 3/053 30/216 |
| 5,640,771 A | * | 6/1997 | Guerrucci .......... | A01G 3/053 30/132 |
| 5,675,896 A | * | 10/1997 | Aiyama .............. | A01G 3/053 30/216 |

(Continued)

*Primary Examiner* — Laura M Lee
(74) *Attorney, Agent, or Firm* — Rabin & Berdo, P.C.

(57) ABSTRACT

The present invention provides a power-driven hedge trimmer with a movable front handle. The power-driven hedge trimmer includes: a power and trimming assembly, a gripping assembly and a control unit. The power and trimming assembly includes a trimming blade and a power source. The trimming blade is connected to the power source so as to be driven to reciprocate. The gripping assembly includes a front gripping portion, a connecting portion and a rear gripping portion. The control unit is disposed on the connecting portion for controlling the power source. The front gripping portion includes a suspended front arm, a front handle and a front stop lock. The front handle is lockable at two locking positions, which are located on two opposite sides of the suspended front arm, with the front stop lock.

7 Claims, 7 Drawing Sheets

(56) References Cited

U.S. PATENT DOCUMENTS

| | | | | |
|---|---|---|---|---|
| 5,689,887 | A * | 11/1997 | Heywood | B23D 49/006 30/216 |
| 5,697,258 | A * | 12/1997 | Aiyama | A01G 3/053 192/131 R |
| D393,402 | S * | 4/1998 | Kikuchi | D8/8 |
| 5,778,649 | A * | 7/1998 | Losdahl | A01G 3/053 30/211 |
| 5,926,960 | A * | 7/1999 | Heywood | A01G 3/053 30/216 |
| 6,018,939 | A * | 2/2000 | Nagashima | A01G 3/053 30/210 |
| 6,499,172 | B1 * | 12/2002 | McCracken | B24B 23/005 15/144.1 |
| 7,155,830 | B2 * | 1/2007 | Sasaki | A01G 3/053 30/208 |
| 7,178,248 | B2 * | 2/2007 | Richards | A01G 3/053 30/210 |
| D543,804 | S * | 6/2007 | Houghton | D8/8 |
| D560,984 | S * | 2/2008 | Tinius | D8/8 |
| 7,549,196 | B2 * | 6/2009 | Ziegs | B24B 23/005 16/430 |
| 7,814,665 | B2 * | 10/2010 | Stones | A01G 3/053 173/170 |
| D655,991 | S * | 3/2012 | Yamamoto | D8/8 |
| D668,512 | S * | 10/2012 | Roise | D8/8 |
| D668,514 | S * | 10/2012 | Sweeney | D8/8 |
| D668,515 | S * | 10/2012 | Landberg | D8/8 |
| 9,113,602 | B2 * | 8/2015 | Hachisuka | A01G 3/053 |
| 2004/0035009 | A1 * | 2/2004 | Richards | A01G 3/053 30/381 |
| 2005/0115080 | A1 * | 6/2005 | Sasaki | A01G 3/053 30/210 |
| 2006/0230623 | A1 * | 10/2006 | Ziegs | B24B 23/005 30/392 |
| 2008/0236986 | A1 * | 10/2008 | Jesse | A01G 3/053 192/18 R |
| 2011/0154796 | A1 * | 6/2011 | Onose | A01G 3/053 56/233 |
| 2012/0055032 | A1 * | 3/2012 | Roise | A01G 3/053 30/216 |
| 2013/0160304 | A1 * | 6/2013 | Tate | B25F 5/02 30/381 |

\* cited by examiner

POWER DRIVEN HEDGE TRIMMER WITH MOVABLE FRONT HANDLE

BACKGROUND OF THE INVENTION

1. Field of the Invention

The present invention relates to a power-driven hedge trimmer, more particularly, to a power-driven hedge trimmer with a movable front handle.

2. The Prior Arts

Common hedge trimmers on the market nowadays usually include a power and trimming assembly and a gripping assembly. The power and trimming assembly mainly consists of a motor and a cutting blade. The motor is able to drive the blade to reciprocate in order to achieve hedge trimming with the reciprocating motion of the cutting blade.

Please refer to the hedge trimmer of Taiwan Design Patent No. D112185, which is shown in FIG. 1 of the present invention. As shown in FIG. 1, in order for a user to steadily hold the hedge trimmer 1a during the operation while the hedge trimmer 1a is vibrating, the gripping assembly usually consists of a front gripping portion 1a and a rear gripping portion 13a, so the user may operate the hedge trimmer 1a with both hands. The front gripping portion 11a in the conventional hedge trimmer 1a is attached to a front end of the rear gripping portion 13a. The front griping portion 11a is vertically aligned with the rear gripping portion 13a; in addition, the front gripping portion 11a and the rear gripping portion 13a are attached to a front side and a rear side of the motor 3a respectively.

Generally speaking, the front gripping portion 11a is disposed on a same axis as the blade to serve as a point of support for the gripping of the machine. In some examples of the conventional hedge trimmer 1a, the rear gripping portion 13a can be adjustable; however, the front gripping portion 11a, the motor 3a and the cutting blade 5a are permanently connected with each other.

FIG. 1 illustrates a front-cutting state of the hedge trimmer 1a. During the front-cutting operation, the rear gripping portion 13a is gripped by the right hand of the operator, and the front gripping portion 11a is gripped by the left hand of the operator (when the operator is right-handed). In addition, in order for the operator to hold the hedge trimmer 1a with a comfortable posture, the left hand of the operator is above the hedge trimmer 1a during the operation. When the hedge trimmer 1a is used for side-cutting, it has to be rotated by 90°. Nevertheless, such rotation is performed by using the wrists of the operator as the pivot points of the rotation, and performing the rotation in such a way may cause the left hand of the operator to deviate from the original position to the right (or left) side of the hedge trimmer 1a. Even though the rear gripping portion 13a may be adjusted before or after the rotation of the hedge trimmer 1a, the left hand of the operator is still turned by 90° in both cases. As a result, both hands of the operator are put in different positions with respect to the original gripping positions after the rotation of the hedge trimmer 1a, thus making the operation of the hedge trimmer 1a rather difficult and awkward.

During the actual operation, the hedge trimmer 1a needs to be rotated to switch between the front-cutting state and the side-cutting state frequently. Since the pivot points of the rotation of the hedge trimmer 1a are the wrists of the operator, the wrists of the operator have to be turned and twisted frequently, and the gripping positions of the left and right hand of the operator are also constantly changing in order for the operator to maintain a most effortless posture for gripping the hedge trimmer 1a.

Notably, when rotating the hedge trimmer 1a, the center of gravity and balance thereof are also constantly changing, and the operator needs to spend extra effort to maintain the center of gravity and the balance of the hedge trimmer 1a. If the operator fails to hold the hedge trimmer 1a properly, not only can the hedge trimmer 1a be damaged from falling and hitting the ground, but also the safety of personnel can be endangered. In addition, since the front gripping portion 11a and the rear gripping portion 13a are connected at two opposite ends of the motor 3a, the operator needs to put in extra force in a horizontal direction to hold the weight of the hedge trimmer 1a and to maintain the center of gravity thereof.

Furthermore, the gripping assembly and the power and trimming assembly of conventional hedge trimmers are connected with each other with only one single rotary shaft. Such structure not only has a low rigidity, but also has a low stability due to the vibration of the motor during the operation of the hedge trimmer.

SUMMARY OF THE INVENTION

Based on the above reasons, a primary objective of the present invention is to provide a power-driven hedge trimmer with a movable front handle, so the operator may hold the hedge trimmer with a comfortable posture during different types of operations. In addition, the gripping position of the left and right hands of the operator can stay unchanged in different operations, thus increasing comfort during prolonged operation.

Another objective of the present invention is to provide a power-driven hedge trimmer, in which the gripping portion and the power source are connected with each other with two rotatable rotary shafts at two opposing ends of the power source. In such a way, the rigidity of the overall structure is increased, and the stability of the hedge trimmer during operation is also enhanced.

Another objective of the present invention is to provide a power-driven hedge trimmer that has a lower overall weight due to a design of the suspended front arm. In this way, the gripping portion can be attached to two opposite ends of the power source without increasing the overall mass of the machine and without compromising the operability of the machine.

For achieving the foregoing objectives, the present invention provides a power-driven hedge trimmer with a movable front handle. The power-driven hedge trimmer includes: a power and trimming assembly, a gripping assembly and a control unit. The power and trimming assembly includes a trimming blade and a power source. The trimming blade is connected to the power source so as to be driven to reciprocate. The gripping assembly includes a front gripping portion, a connecting portion and a rear gripping portion. The front gripping portion is attached to a first side of the power source via a front attaching portion, the rear gripping portion is attached to a second side of the power source opposite to the first side thereof via a rear attaching portion, and the connecting portion is connected with the rear attaching portion, the front gripping portion and the rear gripping portion simultaneously. The control unit is disposed on the connecting portion for controlling the power source. The front gripping portion includes a suspended front arm, a front handle and a front stop lock. The front attaching portion and the connecting portion are connected to two ends of the suspended front arm respectively, the front stop lock is disposed on the suspended front arm, and an end of the front handle is pivotally connected to a front end of the suspended front arm. The front handle is lockable in at least two locking positions, which are located on two opposite sides of the suspended front arm, with the front stop lock.

According to an embodiment of the present invention, the front handle is positioned at a 90° angle between the front handle and the suspended front arm, and the front handle is moveable between the two locking positions.

According to an embodiment of the present invention, the rear gripping portion includes a rear handle, and an end of the rear handle is connected to the connecting portion. In addition, a contacting area between the suspended front arm and the connecting portion is equal to a cross-sectional area of the rear handle. The suspended front arm extends from the connecting portion at a 90°-120° angle.

According to an embodiment of the present invention, both the front attaching portion and the rear attaching portion are rotatable rotary shafts, and a rotation axis of the front attaching portion on the first side of the power source is aligned with a rotation axis of the rear attaching portion on the second side of the power source. A rear stop lock is disposed on the rear gripping portion for locking the front attaching portion and the rear attaching portion at fixed locations.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
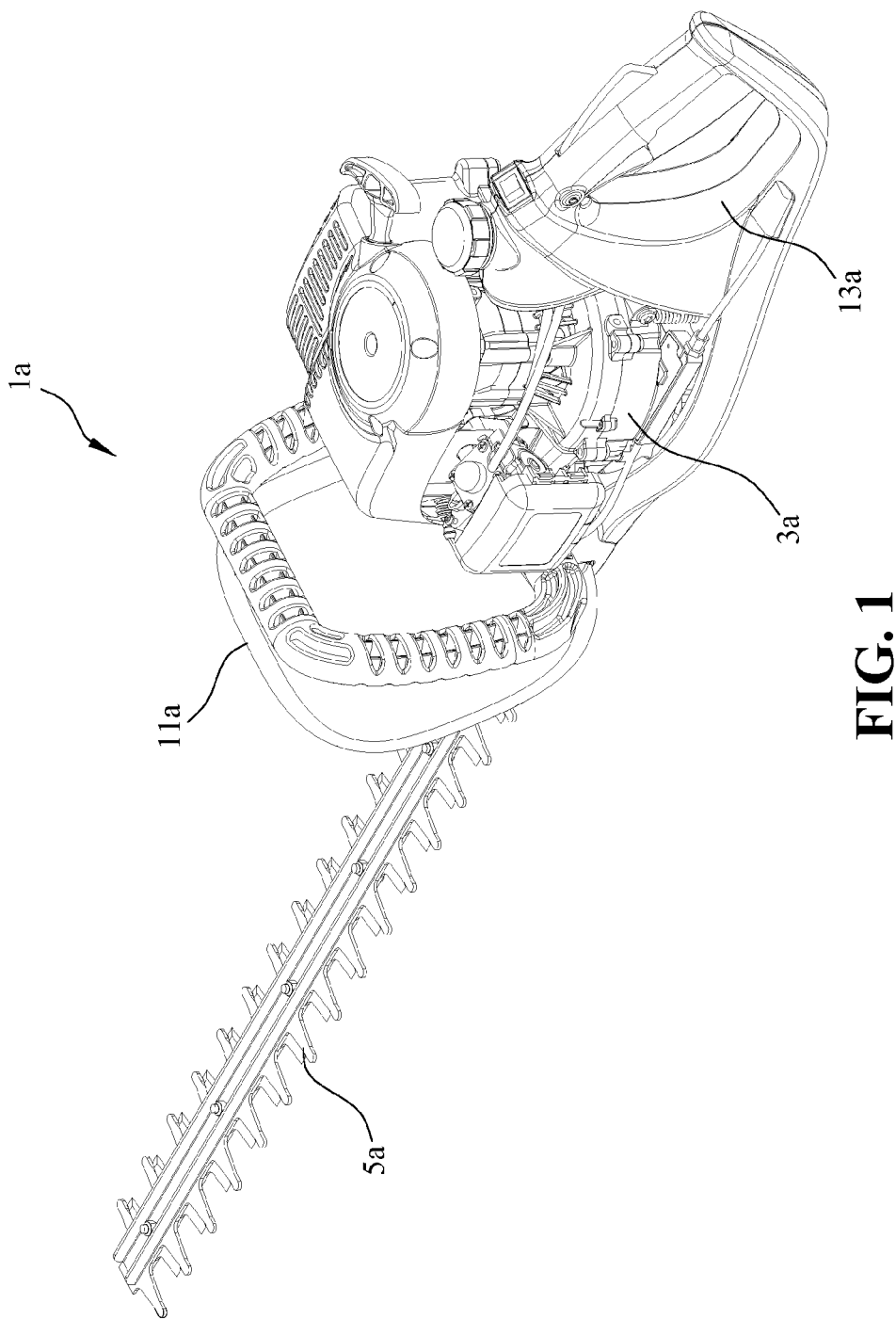
FIG. 1 is a perspective view showing a conventional hedge trimmer.
Figure 2:
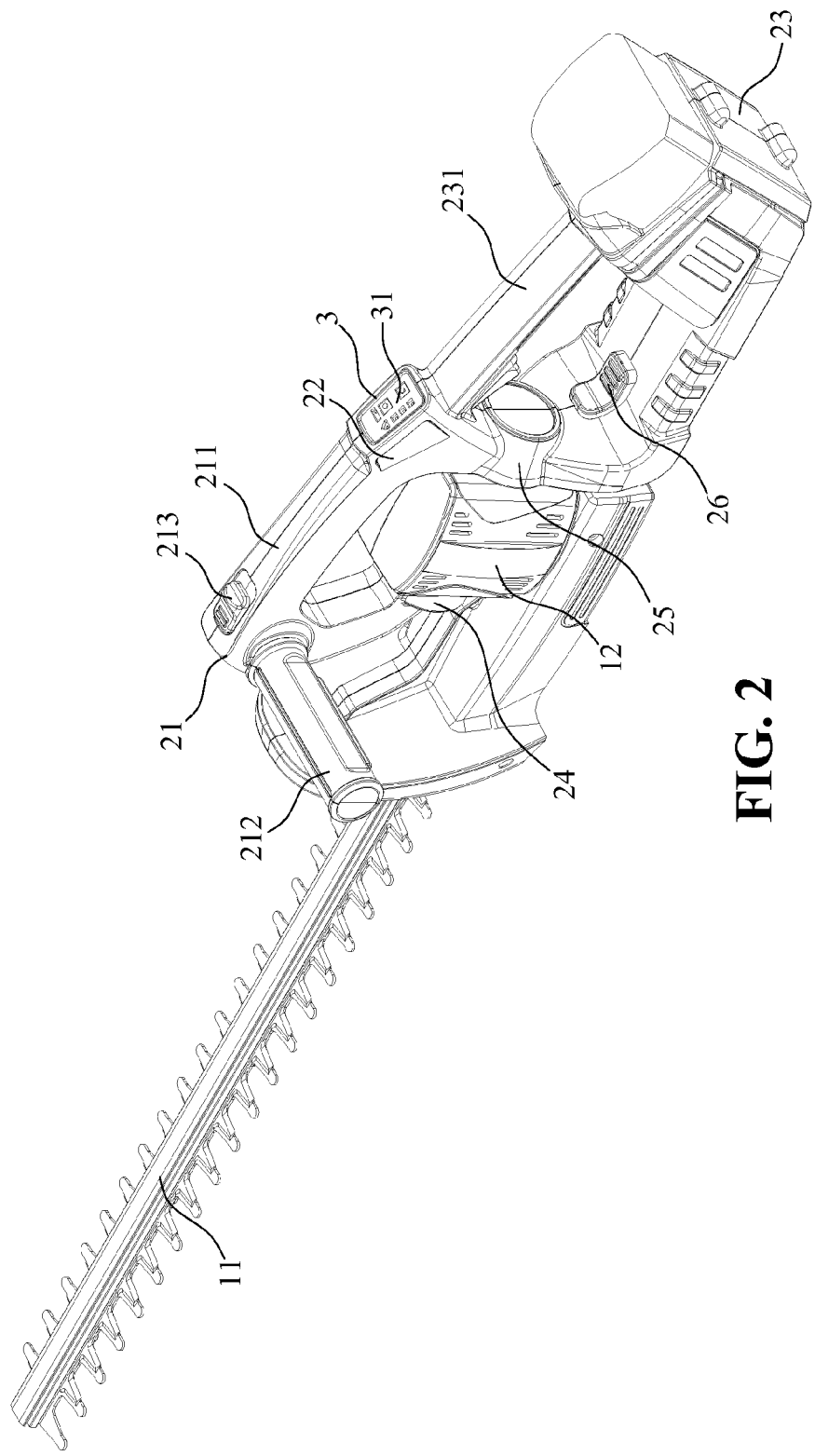
FIG. 2 is a perspective view showing a power-driven hedge trimmer according to a preferred embodiment of the present invention.
Figure 3:
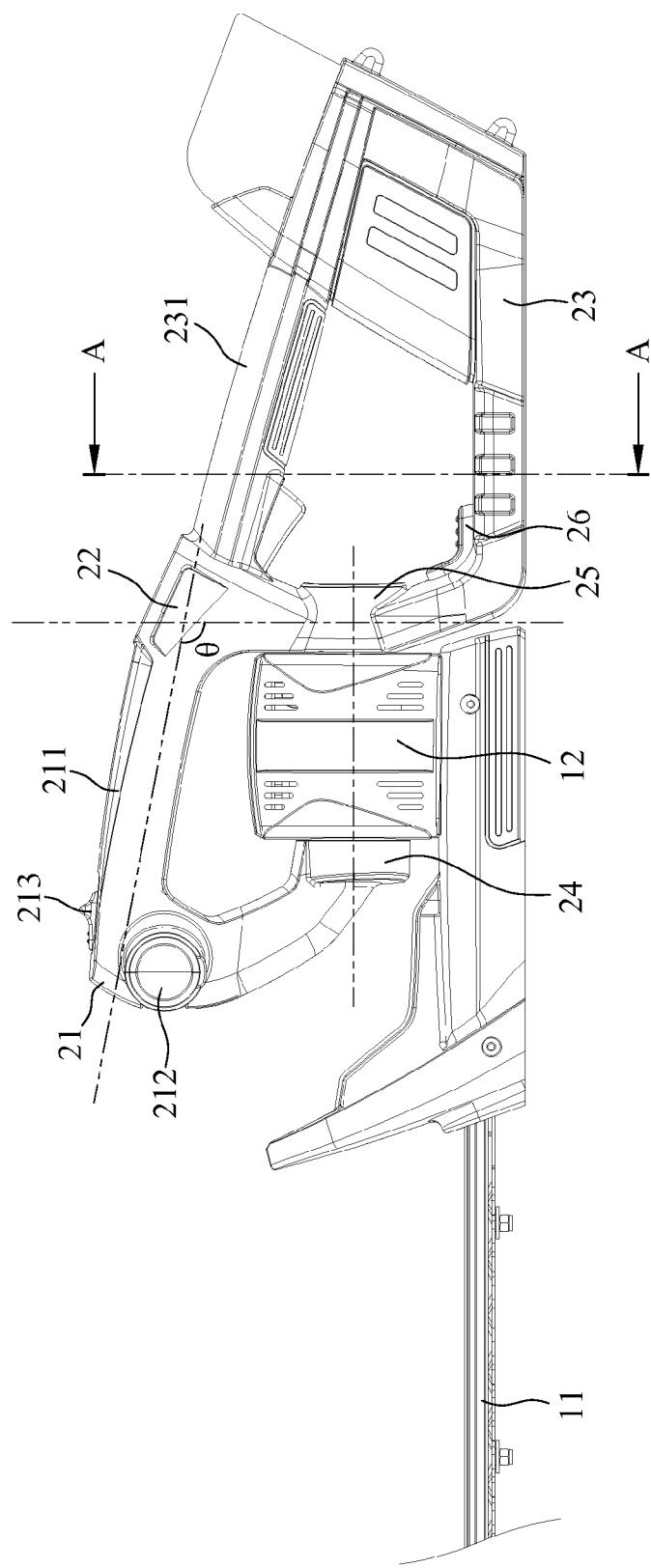
FIG. 3 is a side view showing the power-driven hedge trimmer according to the preferred embodiment of the present invention.

FIG. 2 is a perspective showing a power-driven hedge trimmer according to a preferred embodiment of the present invention, and FIG. 3 is a side view showing the power-driven hedge trimmer according to the preferred embodiment of the present invention. As shown in FIGS. 2 and 3, the power-driven hedge trimmer provided by the present invention includes a power and trimming assembly, a gripping assembly and a control unit.

The power and trimming assembly includes a trimming blade 11 and a power source 12. As shown in FIG. 2, the trimming blade 11 is connected to a motor, which serves as the power source 12, so as to be driven to reciprocate by the power source 12. In such a way, the sharp blades disposed around the peripheral edge of the trimming blade can be used to perform hedge trimming.

In the preferred embodiment of the present invention, the gripping assembly includes a front gripping portion 21, a connecting portion 22 and a rear gripping portion 23. The front gripping portion 21 is attached to a first side of the power source 12 via a front attaching portion 24, the rear gripping portion 25 is attached to a second side of the power source 12 opposite to the first side thereof via a rear attaching portion 25, and the connecting portion 22 is connected with the rear attaching portion 25, the front gripping portion 21 and the rear gripping portion 23 simultaneously. To be more specific, the front gripping portion 21 consists of a suspended front arm 211 and a front handle 212. As shown in FIG. 3, the two ends of the suspended front arm 211 are connected with the front attaching portion 24 and the connection portion 22. An end of the front handle 212 is pivotally connected to a front end of the suspended front arm 211, so the front handle 212 can be rotated with respect to the suspended front arm 211. A front stop lock 213 is disposed on the suspended front arm 211 at a location near the pivotal connection of the front handle 212 for locking the front handle 212. The rear gripping portion 23 includes a rear handle 231. An end of the rear handle 231 is connected to the connecting portion 22 at a side opposite from the suspended front arm 211, and the main body of the rear gripping portion 23 is in connection with the rear handle 231 and the rear attaching portion 25.

Figure 4:
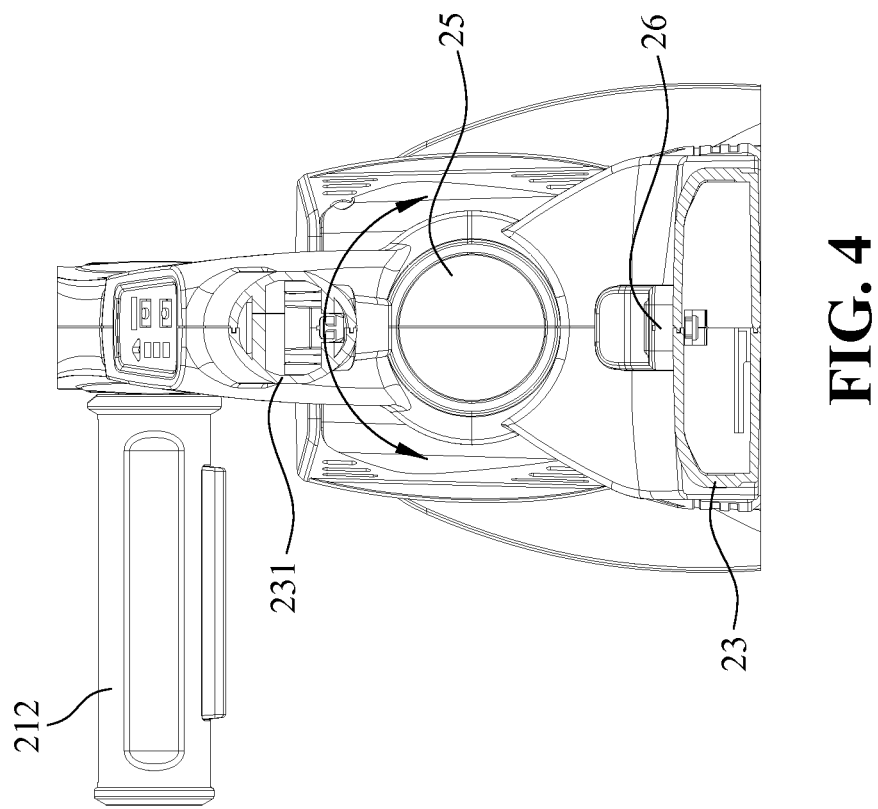
FIG. 4 is a rear view illustrating the rotation of a power assembly of the power-driven hedge trimmer according to the preferred embodiment of the present invention.

In the preferred embodiment of the present invention, both the front attaching portion 24 and the rear attaching portion 25, which are used for attaching the front gripping portion 21 and the rear gripping portion 23 at two opposite sides of the power source 12, are rotatable rotary shafts. As indicated by the dotted line shown in FIG. 3, the mounting positions of the front attaching portion 24 and the rear attaching portion 25 on the two opposite sides of the power source 12 are aligned so that the front attaching portion 24 and the rear attaching portion share a same rotation axis. In this way, the front gripping portion 21 and the rear gripping portion 23 can be rotated with respect to the motor, which serves as the power source 12, in the directions indicated in FIG. 4. As shown in FIG. 4, a rear stop lock 26 is disposed on the rear gripping portion 23 for restricting the rotations of the front attaching portion 24 and the rear attaching portion 25.

As shown in FIG. 2, the control unit 3 of the present invention is a control panel 31. The control panel 31 is disposed on an upper surface of the connecting portion 22, so the operator can control the power source 12 via the control unit 3.

With the above structure and configuration, the operator can adjust the positions of the front handle 212 and the gripping assembly according to the gripping posture needed for a certain type of trimming tasks to be performed, such as front-cutting, right side cutting and left side cutting. Specifically, when adjusting the position of the front handle 212, the front stop lock 213 is switched to release the front handle 212 from the locking restriction of the front stop lock 213. Subsequently, the movable front handle 212 is rotated to a desirable position on either side of the suspended front arm 211, and the front stop lock 213 is switched again to lock the front handle 212 at the desirable position. With the above adjustment, the operator may hold the power-driven hedge trimmer with a comfortable posture during the operation.

In addition, since the suspended front arm 211 is located right above the power source 12, the operator can hold the hedge trimmer effortlessly with one hand only while keeping the balance at the same time by exerting a force in a vertical direction. In such a way, the operator can adjust the power source 12 with the other spare hand, and the operating state of the hedge trimmer can be switched promptly, thus improving the efficiency of the hedge trimming operation.

The present invention is characterized in that the gripping assembly is used as the pivot point of rotation for rotating the power source 12, and the gripping assembly of the hedge trimmer only has to be held stationary by one hand of the operator. The power source 12 can be rotated as long as the pivot point of rotation is held stationary. In order to keep the gripping assembly in a stationary position, the operator has to hold the hedge trimmer steadily and properly with one hand; furthermore, the hand has to stay above the hedge trimmer at all times to ensure the safety of both the machine and the operator.

Figure 5:
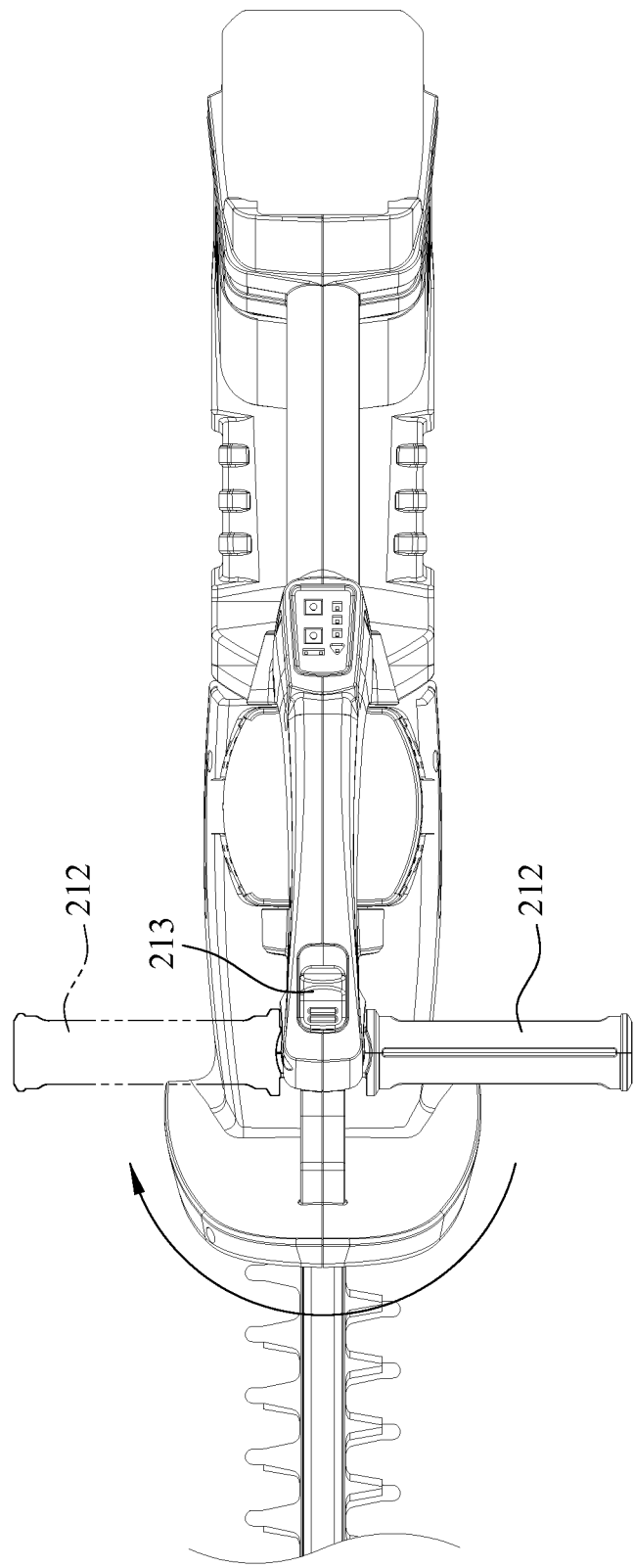
FIG. 5 is a top view illustrating the rotation of a front handle of the power-driven hedge trimmer according to the preferred embodiment of the present invention.

In the preferred embodiment of the present invention, the rotation range of the front handle 212 is between the two locking positions on two opposite sides of the suspended front arm 211, and the front handle 212 is positioned at a 90° angle relative to the suspended front arm 211 in each of the two locking positions, as shown in FIG. 5.

When adjusting the relative position between the gripping assembly and the motor, first, the rear stop lock 26 is switched to release the front attaching portion 24 and the rear attaching portion 25 from the rotation restriction of the rear stop lock 26. Subsequently, the front gripping portion 21 and the rear gripping portion 23 are rotated to a desirable position relative to the power source, and the rear stop lock 26 is switched again to lock the front gripping portion 21 and the rear gripping portion 23 at the desirable positions. With the above operation, the power-driven hedge trimmer of the present invention can be adjusted to suitable positions for various types of operations, and the operator may hold the power-driven hedge trimmer with a consistent and comfortable posture in different types of operations as well.

As shown in FIG. 3, in the preferred embodiment of the present invention, the suspended front arm 211 extends from the connecting portion 22 at a 90°-120° angle θ, and a contacting area between the suspended front arm 211 and the connecting arm 22 is equal to a cross-sectional area of the rear handle 231. With the above features, the structures of the front gripping portion 21 and the rear gripping portion 23 are strong enough to support the power and trimming assembly; in addition, with the designs of the suspended front arm 211 and the rear handle 231 as described above, the power-driven hedge trimmer of the present invention may have a higher rigidity while maintaining a low weight of the overall structure with the suspended structure, thus increasing the operability of the power-driven hedge trimmer.

Due to the adjustable and movable front handle and power assembly, the power-driven hedge trimmer of the present invention may be adjusted to desirable states according to the trimming direction, such as front cutting, right side cutting or left side cutting. When using the power-driven hedge trimmer for front cutting, the operator may use his preferred hands to hold the power-driven hedge trimmer to perform hedge cutting. For example, when the hedge trimmer is in the state as shown in FIG. 2, the operator may hold the front handle 212 with his left hand and may hold the rear handle 231 with his right hand to operate the machine. If the operator wishes to hold the front handle 212 with his right hand, he may also adjust the position of the front handle 212 with the front stop lock 213, as shown in FIG. 5.

Figure 6:
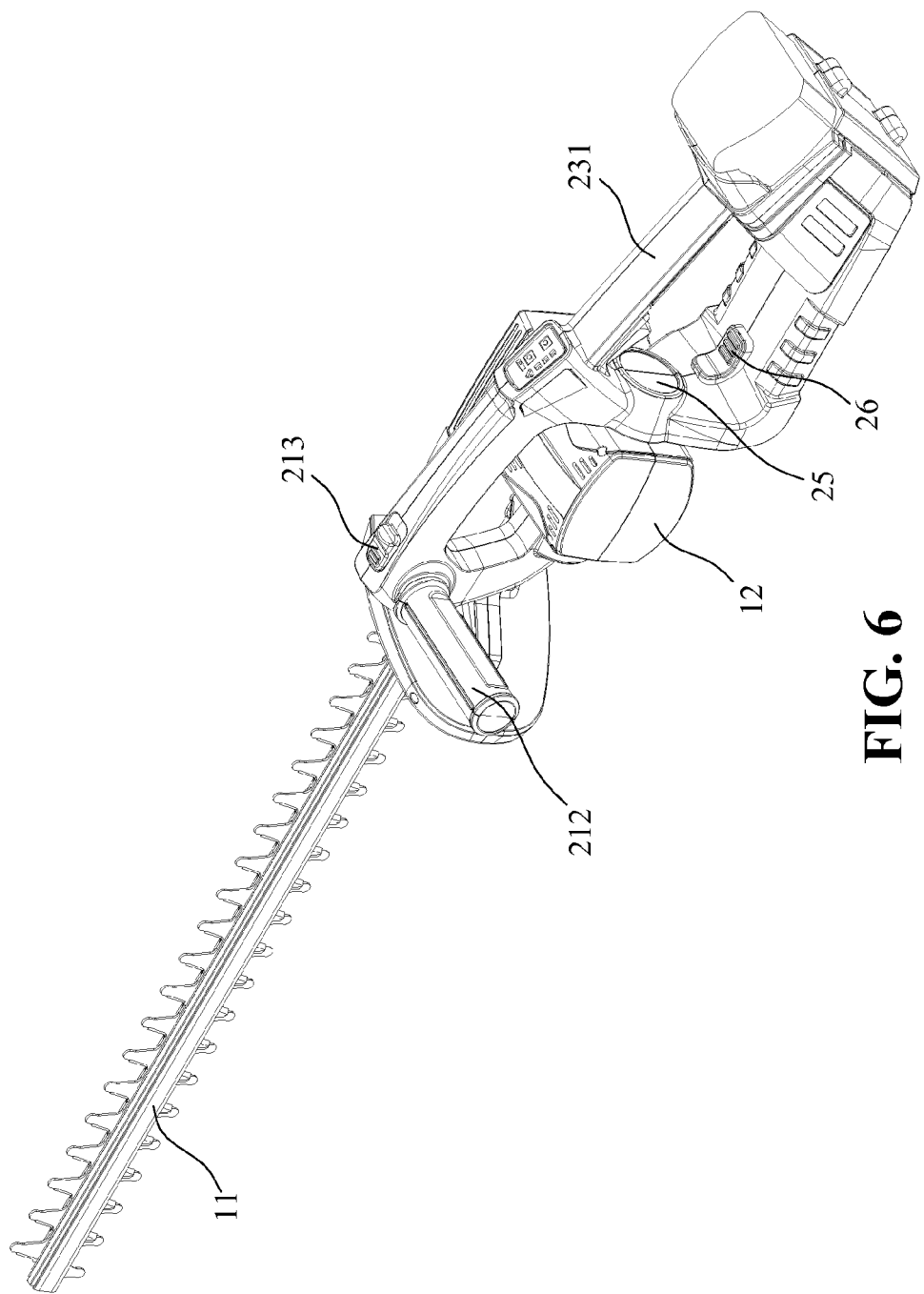
FIG. 6 is a perspective view illustrating the power-driven hedge trimmer of the present invention in a right side cutting state.

When using the power-driven hedge trimmer of the present invention to perform right side cutting, the operator may release the rear stop lock 26 to rotate the front gripping portion 21 and the rear gripping portion 23 with respect to the trimming blade 11 and the power source 12 to the position shown in FIG. 6. The front gripping portion 21 and the rear gripping portion 23 are then locked at the positions shown in FIG. 6 by switching the rear stop lock 26 again. As shown in FIG. 6, when performing the operation of right side cutting, the position of the front handle 212 is at the same position with the one shown in FIG. 2. Since the front handle 212 is perpendicular to the rear handle 231, the operator may perform the right side cutting using the same posture as the posture used for front cutting; namely, the right side cutting may be performed by holding the front handle 212 with the left hand and holding the rear handle 231 with the right hand.

Figure 7:
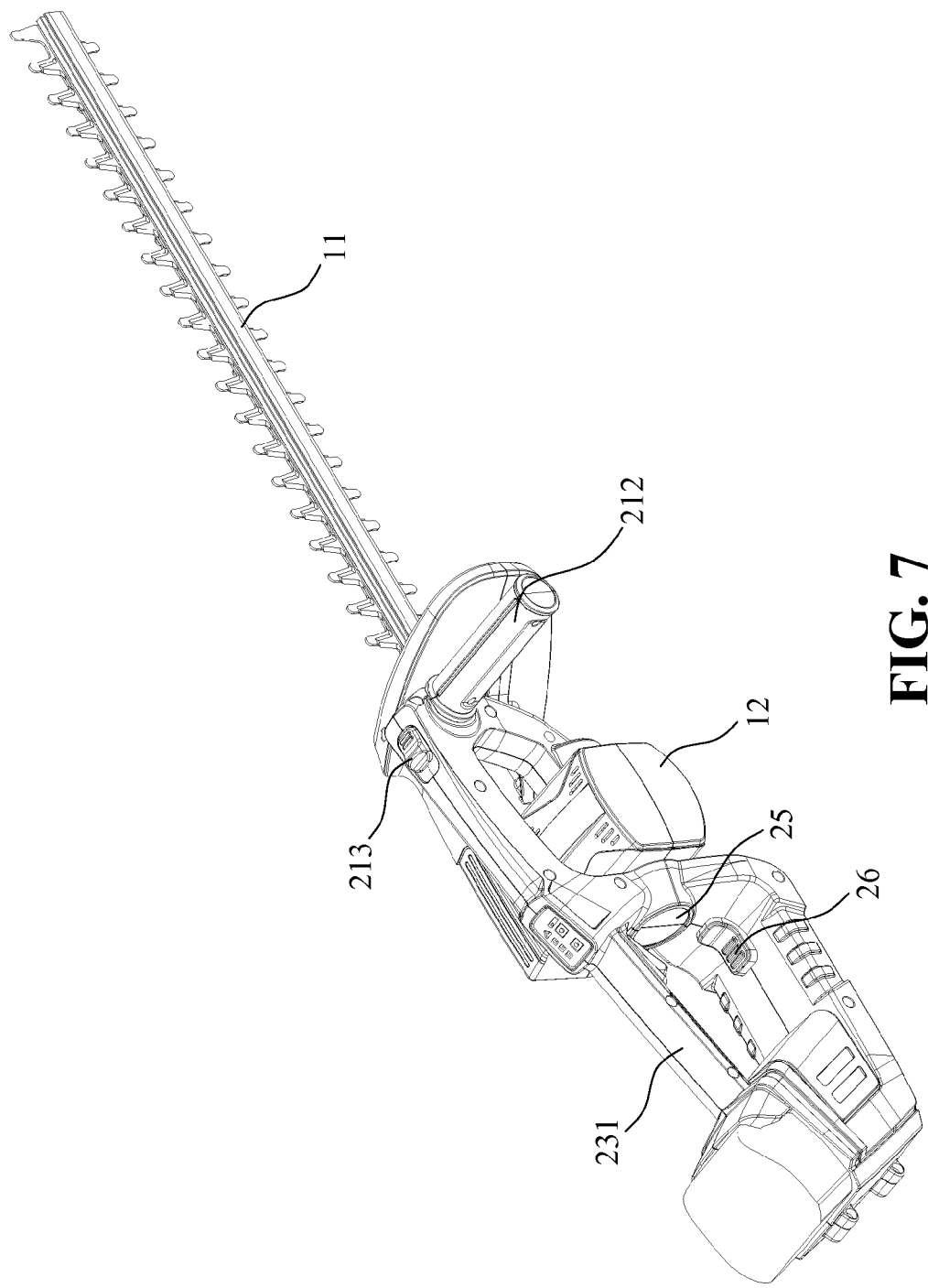
FIG. 7 is a perspective view illustrating the power-driven hedge trimmer of the present invention in a left side cutting state.

When using the power-driven hedge trimmer of the present invention to perform left side cutting, the operator may release the front stop lock 213 and the rear stop lock 26 to rotate the front handle 212, the front gripping portion 21 and the rear gripping portion 23 relative to the trimming blade 11 and the power source 12 to the positions shown in FIG. 7. The front handle 212, the front gripping portion 21 and the rear gripping portion 23 are then locked at the positions shown in FIG. 7 by switching the front stop lock 213 and the rear stop lock 26 again. As shown in FIG. 7, when performing the operation of left side cutting, the position of the front handle 212 is on the right side of the rear handle 231 while still being perpendicular to the rear handle 231. Hence, the operator may perform the left side cutting using a posture similar to the postures used for front cutting and right side cutting, i.e., the left side cutting may be performed by holding the front handle 212 with the right hand and holding the rear handle 231 with the left hand.

The power-driven hedge trimer of the present invention is provided with a movable front handle and a movable power assembly. The movable front handle and the movable power assembly can be adjusted according to the types of operations to be performed, thereby allowing the operator to maintain a comfortable and consistent gripping posture throughout various types of operations. Thus, the experience of using the hedge trimmer provided by the present invention for prolonged operation is ameliorated. Furthermore, the gripping assembly and the power assembly are connected via two rotatable attaching portions. Not only are the rigidity and stability of the hedge trimmer improved by doing so, but the operability and applicability of the hedge trimmer are also enhanced with a suspended design, which lowers the overall mass of the hedge trimmer.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A power-driven hedge trimmer, comprising:
    a power and trimming assembly comprising a trimming blade and a power source, wherein the trimming blade is connected to the power source so as to be driven to reciprocate;
    a gripping assembly comprising a front gripping portion, a connecting portion and a rear gripping portion, wherein the front gripping portion is attached to a first side of the power source via a front attaching portion, the rear gripping portion is attached to a second side of the power source opposite to the first side thereof via a rear attaching portion, and the connecting portion is connected with the rear attaching portion, the front gripping portion and the rear gripping portion simultaneously; and a control unit disposed on the connecting portion for controlling the power source;

wherein the front gripping portion includes a suspended front arm, a front handle and a front stop lock, the front attaching portion and the connecting portion are connected to two ends of the suspended front arm respectively, the front stop lock is disposed on the suspended front arm, and an end of the front handle is pivotally connected to a front end of the suspended front arm;

wherein the front handle is lockable in at least two locking positions, which are located on two opposite sides of the suspended front arm, with the front stop lock, wherein an end of the front handle is pivotally connected to a front end of the suspended front arm, so the front handle can be rotated with respect to the suspended front arm, and a front stop lock is disposed on the suspended front arm at a location near the pivotal connection of the front handle for locking the front handle, and wherein the rotational axis of the front handle is perpendicular to the longitudinal direction of the trimming blade, the front handle rotating horizontally around the rotational axis between a first position and a second position at the two sides of the suspended front arm, the first position and the second position forming a 180 degree angle.

2. The power-driven hedge trimmer according to claim 1, wherein the front handle is positioned at a 90° angle relative to the suspended front arm, and the front handle is moveable within a range in each of the two locking positions.

3. The power-driven hedge trimmer according to claim 1, wherein the rear gripping portion comprises a rear handle, and an end of the rear handle is connected to the connecting portion.

4. The power-driven hedge trimmer according to claim 3, wherein a contacting area between the suspended front arm and the connecting portion is equal to a cross-sectional area of the rear handle.

5. The power-driven hedge trimmer according to claim 1, wherein the suspended front arm extends from the connecting portion at a 90°-120° angle.

6. A power-driven hedge trimmer, comprising:

a power and trimming assembly comprising a trimming blade and a power source, wherein the trimming blade is connected to the power source so as to be driven to reciprocate;

a gripping assembly comprising a front gripping portion, a connecting portion and a rear gripping portion, wherein the front gripping portion is attached to a first side of the power source via a front attaching portion, the rear gripping portion is attached to a second side of the power source opposite to the first side thereof via a rear attaching portion, and the connecting portion is connected with the rear attaching portion, the front gripping portion and the rear gripping portion simultaneously; and a control unit disposed on the connecting portion for controlling the power source;

wherein the front gripping portion includes a suspended front arm, a front handle and a front stop lock, the front attaching portion and the connecting portion are connected to two ends of the suspended front arm respectively, the front stop lock is disposed on the suspended front arm, and an end of the front handle is pivotally connected to a front end of the suspended front arm;

wherein the front handle can be locked in at least two locking positions, which are located on two opposite sides of the suspended front arm, with the front stop lock, wherein both the front attaching portion and the rear attaching portion are rotary shafts, and a rotation axis of the front attaching portion on the first side of the power source is aligned with a rotation axis of the rear attaching portion on the second side of the power source.

7. The power-driven hedge trimmer according to claim 6, wherein a rear stop lock is disposed on the rear gripping portion for locking the front attaching portion and the rear attaching portion at fixed locations.

* * * * *